(12) United States Patent
Atmur (10) Patent No.: US 7,374,130 B2
(45) Date of Patent: *May 20, 2008

(54) METHOD AND APPARATUS FOR VEHICLE CONTROL USING VARIABLE BLADE PITCH

(75) Inventor: Robert J. Atmur, Whittier, CA (US)

(73) Assignee: The Boeing Company, Chicago, IL (US)

( * ) Notice: Subject to any disclaimer, the term of this patent is extended or adjusted under 35 U.S.C. 154(b) by 479 days.

This patent is subject to a terminal disclaimer.

(21) Appl. No.: 10/986,264

(22) Filed: Nov. 10, 2004

(65) Prior Publication Data

US 2006/0097103 A1 May 11, 2006

(51) Int. Cl.
*B64C 11/34* (2006.01)

(52) U.S. Cl. .......................................... 244/51; 416/98

(58) Field of Classification Search ................ 244/51; 416/24, 98, 205; 440/50
See application file for complete search history.

(56) References Cited

U.S. PATENT DOCUMENTS

| | | | |
|---|---|---|---|
| 2,433,641 A * | 12/1947 | Young | 244/51 |
| 3,107,881 A * | 10/1963 | Stuart, III | 244/7 C |
| 3,201,068 A * | 8/1965 | Miller et al. | 244/17.23 |
| 4,571,192 A | 2/1986 | Gongwer | |
| 5,291,194 A | 3/1994 | Ames | |
| 5,646,366 A | 7/1997 | O'Connell | |
| 5,748,102 A | 5/1998 | Barron | |
| 6,331,759 B1 | 12/2001 | Atmur | |
| 6,482,054 B2 | 11/2002 | Treaster et al. | |
| 6,536,365 B1 | 3/2003 | Horton | |
| 6,600,695 B1 | 7/2003 | Nugent et al. | |
| 6,642,683 B1 | 11/2003 | Atmur | |
| 6,926,566 B2 * | 8/2005 | Atmur | 440/38 |
| 2003/0001538 A1 | 1/2003 | Atmur | |
| 2003/0103771 A1 | 6/2003 | Atmur et al. | |

OTHER PUBLICATIONS

RIM-116A Rolling Airframe Missile (RAM) . United States Navy Fact File. [online]. Retrieved from Internet: <URL: www.chinfo.navy.mil/navpalib/factfile/missiles/wep-ram.html>.
Principles of Naval Architecture, Second Revision, Edward V. Lewis Editor, Published by The Society of Naval Architects and Marine Engineers, Jersey City, NJ, Library of Congress Catalog Card No. 88-60829, ISBN No. 0-939773-01-5.

* cited by examiner

*Primary Examiner*—Rob Swiatek
(74) *Attorney, Agent, or Firm*—Ingrassia Fisher & Lorenz, P.C.

(57) ABSTRACT

An integrated propulsion and guidance system for an aircraft or other vehicle includes an engine coupled to a propeller via a driveshaft to produce propulsive force. One or more of the propeller blades are pivotably mounted with respect to the hub of the propeller. A control signal is provided to adjust the blade pitch of the pivotable blades as the blades rotate about the hub. The change in blade pitch as the blade rotates produces a torque imbalance that can be used to control the heading of the vehicle. By varying the magnitude and phase of the control signal provided to the propeller, the torque can be applied in a multitude of distinct reference planes, thereby allowing the orientation of the vehicle to be adjusted through action of the pivotable propeller blade(s).

17 Claims, 6 Drawing Sheets

METHOD AND APPARATUS FOR VEHICLE CONTROL USING VARIABLE BLADE PITCH

TECHNICAL FIELD

The present invention generally relates to vehicle propulsion systems, and more particularly relates to a variable blade pitch system that simultaneously provides propulsion and guidance to an aircraft or other vehicle.

BACKGROUND

Various types of manned and unmanned aircraft have been in use for a wide array of commercial, military, homeland security and other purposes for many years. Many of these aircraft are guided by re-directing air passing across a wing or other control surface using conventional control surfaces such as ailerons, flaps, rudders, elevators, vertical stabilizers and the like. Other aircraft are further guided by so-called "vectored thrust" techniques whereby a moveable nozzle adjusts the direction of thrust produced by an engine. Although not common on commercial aircraft, vectored thrust techniques are commonly employed in fighter planes, vertical take-off and landing (VTOL) aircraft and the like.

While conventional guidance systems using vectored thrust and/or control surfaces are effective for many purposes, the full potential of various aircraft is limited by the propulsion and control systems currently available. For very slow-moving aircraft, for example, very precise control is typically desired, yet this level of control is not generally available from conventional control surface assemblies. While vectored thrust assemblies have been used in VTOL systems, the mechanical linkages commonly used in such systems (particularly in aircraft such as the V-22 Osprey, wherein the entire engine pod pivots to alternate between vertical and horizontal thrust) can be highly complicated, thereby resulting in increased cost and weight. Accordingly, it is desirable to create a vehicle control and propulsion system that is able to precisely propel and guide the aircraft in a variety of highly demanding environments and applications. In addition, it is desirable to create a technique for controlling and propelling an aircraft that is effective at low speeds, that operates without complex linkages at a relatively low cost, and that provides precise control of the vehicle. Furthermore, other desirable features and characteristics of the present invention will become apparent from the subsequent detailed description and the appended claims, taken in conjunction with the accompanying drawings and the foregoing technical field and background.

BRIEF SUMMARY

According to various exemplary embodiments, an aircraft or other vehicle is simultaneously propelled and guided by adjusting the blade pitch of one or more propeller blades. As the propeller rotates about a hub, one or more blades are appropriately pivoted to create torque imbalances about the vehicle's center of mass. These imbalances can be controlled by adjusting the phase and magnitude of the blade oscillations. By integrating variable blade pitch techniques into a turbine engine such as a turboprop or turbojet engine, an engine pod or cell can be created that allows for simultaneous propulsion and guidance of the vehicle.

In an exemplary embodiment, an integrated propulsion and guidance system includes an engine coupled to a propeller via a driveshaft to produce propulsive force. One or more of the propeller blades are pivotably mounted with respect to the hub of the propeller. A control signal is provided to adjust the blade pitch of the pivotable blades as the blades rotate about the hub. The change in blade pitch as the blade rotates produces a torque imbalance that can be used to control the heading of the vehicle. By varying the magnitude and phase of the control signal provided to the propeller, the torque can be applied in a multitude of distinct reference planes, thereby allowing the orientation of the vehicle to be adjusted through action of the pivotable propeller blade(s).

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

According to various exemplary embodiments, a control system and method for a vehicle operating in a fluid medium (e.g. air, water) uses the propulsion element (e.g. impeller or propeller) of the vehicle to produce guidance force as well as propulsive force. By selectively adjusting the pitch angle of one or more propulsion blades as the blades rotate through the fluid medium, the relative forces and moments produced by the various blades can be manipulated to produce torques on the vehicle driveshaft that can be used to position the vehicle. One or more propeller blades, for example, can be actuated in a sinusoidal or sawtooth manner (without actuating the remaining blades) such that one period of actuation is completed for each revolution of the blade at a predetermined phase relative to the "heads up" of the vehicle and at a magnitude proportional to a desired command. This action produces a force on the blade that is completely determined by the magnitude and phase (R-theta) of the blade motion. By selectively varying the pitch of one or more blades with respect to the other blades on the propeller, force imbalances are created about the driveshaft that result in a moments about the vehicle's center of mass that effectively re-orient the vehicle as desired.

Although the invention is frequency described herein as applying to pivoting propeller blades on an aircraft, the concepts and structures described herein may be readily adapted to a wide array of equivalent environments. The propulsion and guidance techniques described herein could be used on any type of impeller or propeller-driven aircraft or watercraft, for example, including any type of airplane, surface vessel, underwater vessel, aerial drone, torpedo, missile, or manned or unmanned vehicle.

As used herein, the term "substantially" is intended to encompass the specified ranges or values, as well as any variations due to manufacturing, design, implementation and/or environmental effects, as well as any other equivalent values that are consistent with the concepts and structures set forth herein. Although numerical tolerances for various structures and components will vary widely from embodiment to embodiment, equivalent values will typically include variants on the order of plus or minus fifteen percent or more from those specified herein.

Figure 1A:
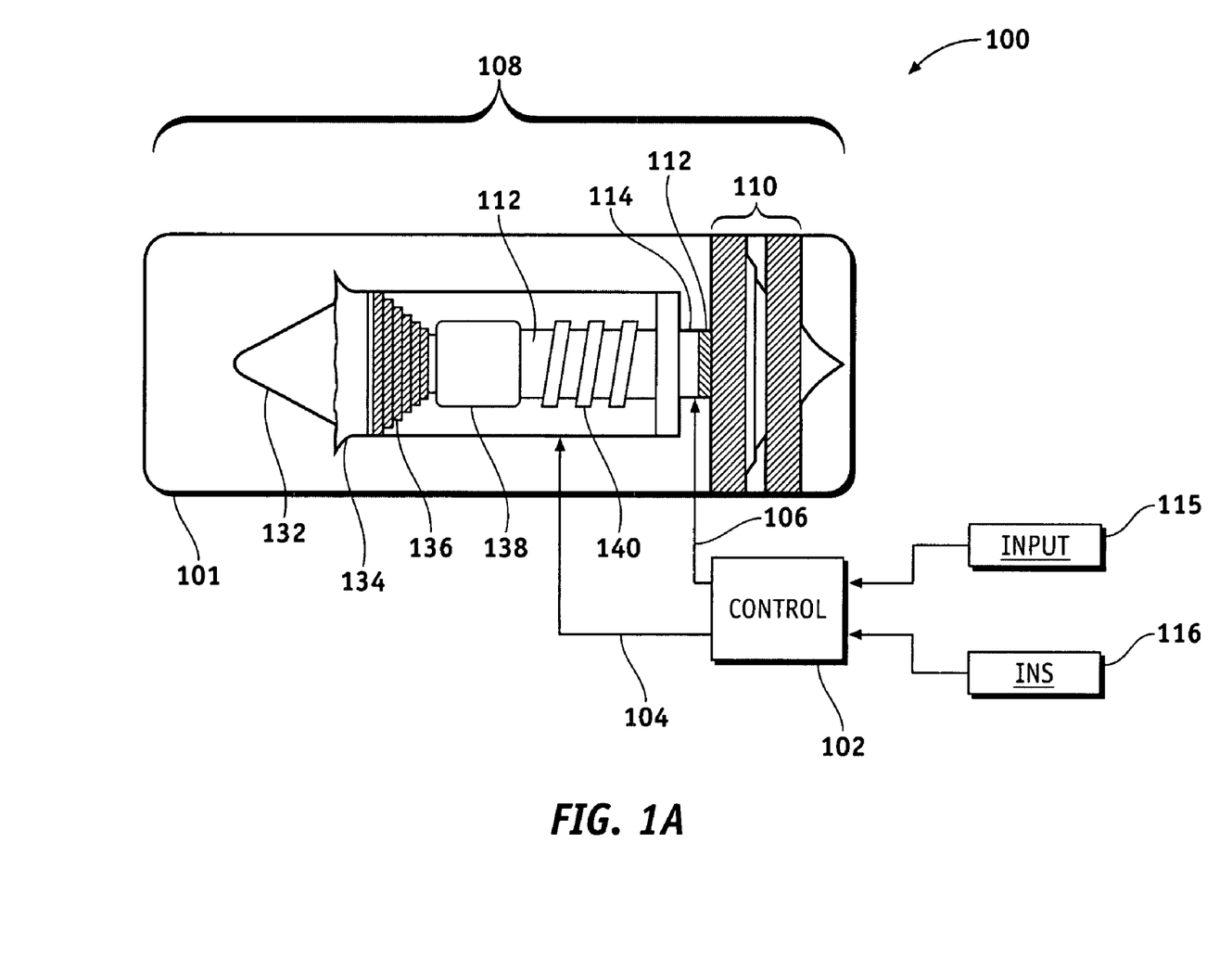
FIG. 1A is a block diagram of an exemplary control system capable of simultaneously propelling and guiding an aircraft.

Turning now to the drawing figures and with initial reference to FIG. 1, an exemplary control system 100 suitably includes an engine 108 providing rotational energy to one or more propellers 110 via a driveshaft 112. A control motor 114 is used to position one or more control blades of propeller 110 as described more fully below. The speed and position of engine 108 and control motor 114 remain synchronized by command signals 104, 106 produced by a controller 102. Signals 104, 106 are further used to control the propulsion and orientation of vehicle 100 as appropriate. In particular, controller 102 supplies a position command 106 to control motor 114 that is relative to engine 108 and/or another point of reference (e.g. the "heads up" orientation of vehicle 100, a vertical or horizontal reference, or the like) to displace the pitch angle of the control blades relative to the fixed impellor blades at the correct locations and times during rotation to produce the torque desired to properly position the vehicle.

Engine 108, driveshaft 112 and propeller 110 may be collectively referenced as an engine "pod" or "cell" 101. A vehicle may have one or more cells 101 providing propulsive and guidance forces as appropriate. An aircraft may have two or more pods 101, for example, located on opposing sides of the aircraft fuselage. Pods 101 may be affixed to the wings of the aircraft, for example, or may be attached to any part of the fuselage (e.g. fore or aft of the aircraft's center of mass), as described more fully below.

Engine 108 is any power plant or other source of mechanical energy that can produce propulsive force with propeller 110. In various embodiments, engine 108 is any type of turbine engine, such as a turboprop, turbofan, turbojet or other type of engine. Accordingly, the exemplary engine 108 shown in FIG. 1 includes conventional turbofan components such as a compressor 140, a combustor 138, a turbine 136, a mixer 134 and a nozzle 132 producing energy that drives shaft 112 to rotate propeller 110. The concepts used herein, however, could be implemented with any type of turbine or non-turbine engine, including any engines suitable for use on aircraft or seacraft. Similarly, although propeller 110 is shown in FIG. 1 as an engine fan having two separate propellers rotating on shaft 112, propeller 110 could be equivalently implemented with any number of propellers, rotors, fans or other propulsive elements which may be physically located inside or outside of pod 101. Propeller 110 suitably contains one or more control blades that are pivotable with respect to the propeller hub to create force/torque imbalances on the vehicle, as described more fully below.

Controller 102 is any processor, processing system or other device capable of generating control signals 104, 106 to engine 108 and control motor 114, respectively. In various embodiments, controller 102 is a microcontroller or microprocessor-based system with associated memory and/or storage for storing data and instructions executed by the processor. Although a single controller 102 is shown in FIG. 1, alternate embodiments may use two or more separate processors for producing control signals 104 and 106.

Control signals 106, 108 are produced using any appropriate computation or control technique. In an exemplary embodiment, controller 102 receives operator inputs 115 and/or input from an inertial navigation system (INS) 116, gyroscope, global positioning system (GPS) or other device to obtain data about a current and desired state of the vehicle (e.g. position, orientation, velocity, etc.). Controller 102 then creates appropriate control signals 104, 106 using any conventional data processing and/or control techniques presently known or subsequently developed. In various embodiments, control signal 104 provided to engine 108 includes data relating to the direction and/or magnitude of the rotational force applied to propeller 110 by engine 108 via driveshaft 112, which in turn generally corresponds to the direction and magnitude of propulsive force applied to vehicle 100. Similarly, control signal 106 is provided to control motor 114 to produce appropriate variation in the pitch of one or more propeller control blades, which in turn produces changes in the heading of vehicle 100, as described more fully below. Control motor 114 may actuate the control blades on propeller 110 in any appropriate manner, such as though the use of electronic, hydraulic, magnetic, electrostatic, mechanical or any other actuation technique. Signals 104, 106 may be provided in any digital or analog format, including pulse coded modulation (PCM) or the like.

In operation, then, controller 102 suitably generates drive signals 104, 106 as a function of operator inputs 115 and/or inertial or other position data 116. Engine 108 demodulates and/or decodes signal 104 to provide an appropriate rotational force on driveshaft 112, and to thereby rotate propeller 110 in a desired direction. Control motor 114 similarly demodulates and/or decodes signal 106 to provide appropriate control inputs to adjust the blade pitch of one or more blades on propeller 110, which in turn provides appropriate forces and/or moments on shaft 112 or another portion of vehicle 100 to place vehicle 100 into a desired orientation. Accordingly, both vehicle propulsion and guidance is provided by a common propeller 110.

Figure 1B:
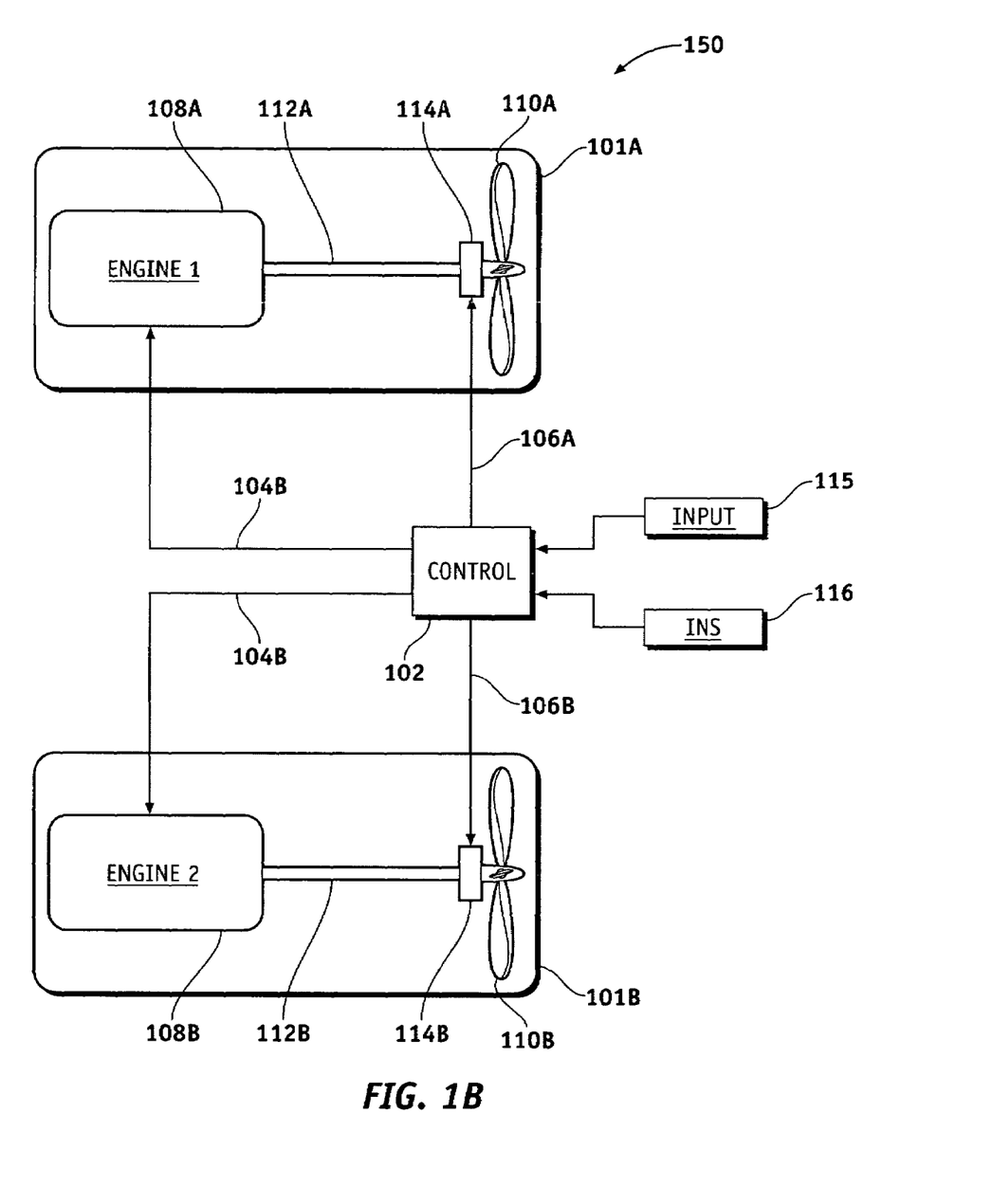
FIG. 1B is a block diagram of an exemplary dual-engine control system capable of simultaneously propelling and guiding an aircraft

Similar concepts may be applied to vehicles with more than one propeller 110. With reference now to FIG. 1B, an exemplary dual-engine control system 150 suitably includes two driveshafts 112A-B coupling rotational energy from engines 108A and 108B to propellers 110A and 110B, respectively. Propellers 110A and 110B are typically counter-rotating (i.e. rotating in opposite directions) to reduce noise and turbulence commonly associated with single propeller systems. Each of propellers 110A and 110B suitably include one or more pivotable control blades acting in tandem with each other to provide appropriate forces and moments to direct vehicle 150 in response to control signals 106A and 106B, respectively. Such embodiments may provide control signals 106A-B to control motors 114A-B (respectively) that are approximately identical, but 180 degrees out of phase for counter-rotating propellers 110A-B due to the different directions of rotation. In various embodiments employing counter-rotating propellers 110A-B, the direction of overall thrust produced by system 150 remains substantially unchanged due to the opposing directions of the control blades. That is, changes in thrust that are produced through actuation of a control blade on the first propeller are offset by changes produced by the control blade on the second propeller. Even as the overall direction of thrust remains constant, however, the forces and moments produced by the control blades can be controlled to position the vehicle, thereby reducing or eliminating the need for vectored thrust techniques.

Alternate but equivalent embodiments to those discussed above may include multiple driveshafts 112 powered by a common engine 108. Similarly, multiple propellers 110 could be placed on a common driveshaft 112 to produce additional thrust using concepts similar to those discussed with regard to propellers 110 in FIG. 1. Moreover, counter-rotating propellers 110 could be placed in series (i.e. such that each propeller rotates about a common axis), with driveshaft 112 having an inner portion rotating one of the propellers 110 in a first direction and an outer portion rotating the other propeller 110 in the same or an opposite direction. As described above, the counter-rotating propellers 110 could be operated in a manner that produces forces and moments for positioning the vehicle without significantly affecting the direction of thrust produced by engine(s) 108. Accordingly, equivalent embodiments of vehicle 100/150 will include any number of propellers 110 arranged in any serial and/or parallel manner and rotating in any directions about any number of driveshafts 112.

Figure 2:
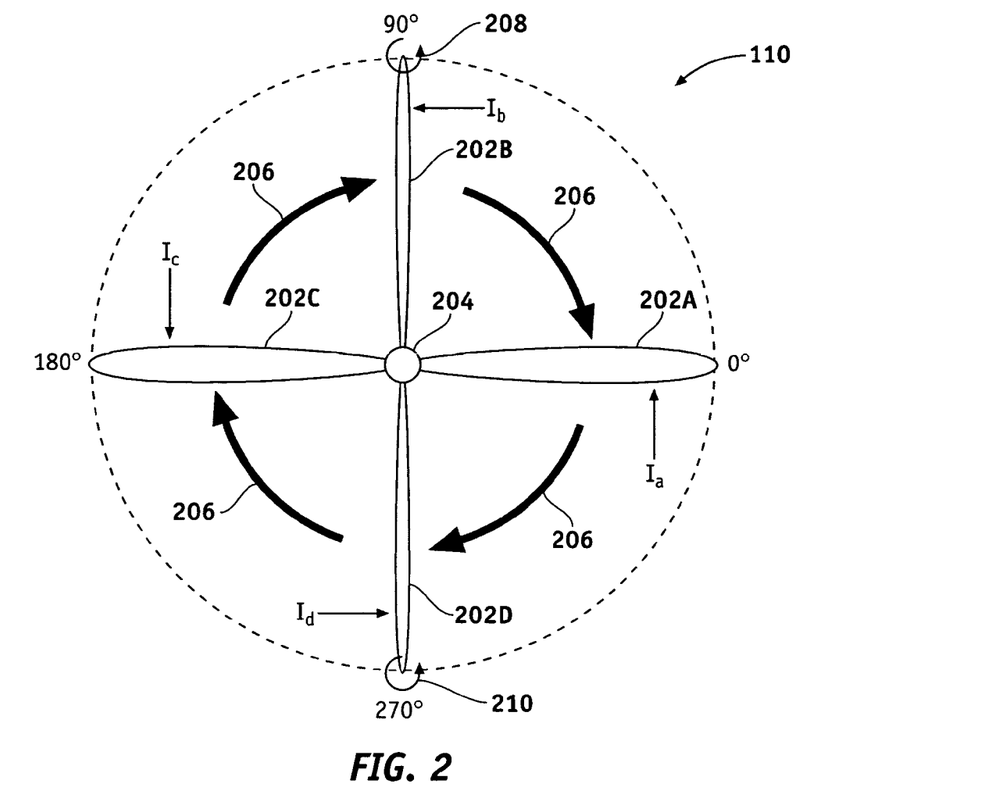
FIG. 2 is a rear view of an exemplary propeller with rotatable blades.

Referring now to FIG. 2, an exemplary propeller 110 suitably includes two or more blades 202A-D rotating about a central hub 204 as appropriate. One or more of blades 202A-D is pivotable with respect to hub 204 to vary the pitch of the blade in response to control signal 106 (FIG. 1). In the exemplary embodiment shown in FIG. 2, two blades 202B, 202D are pivotable about an axis parallel to driveshaft 112 (FIG. 1), although in alternate embodiments any number of blades could be made to be pivotable. In embodiments using an odd number of blades, however, the mathematics used to model and control propeller 110 may be greatly simplified if an odd number (e.g. one or three) of blades 202 are pivotable. Similarly, in embodiments using an even number of blades, control may be easiest when pairs of opposing blades (e.g. blades directly opposite hub 204) are made to be pivotable. Nevertheless, various embodiments could be formulated with any even or odd number of blades (e.g. one to about eight or more in a conventional propeller, or dozens or more blades in a turbofan implementation), each with any number of pivotable blades in any arrangement. Pivotable blades are also referred to herein as "control blades".

Figure 4A:
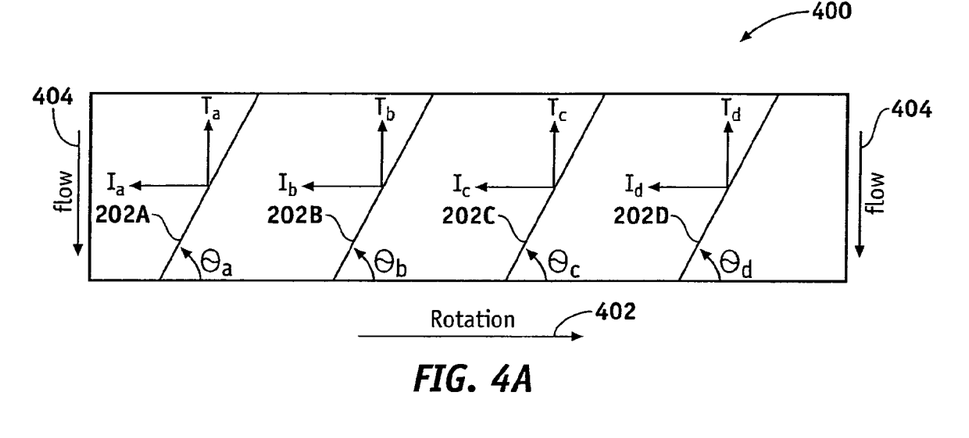
FIGS. 4(a) and 4(b) are diagrams showing forces applied by an exemplary propeller with uniform and non-uniform blade pitch, respectively.

As blades 202A-D rotate about hub 204, each blade provides an impedance force (shown as vectors $I_{a-d}$, respectively, in FIG. 2) against the air or other fluid medium that creates a moment about hub 204. In a conventional propeller (e.g. as described below in conjunction with FIG. 4), the pitch of each blade 202 with respect to the fluid is relatively constant. The total impedance forces and moments applied in the plane of blades 202 is therefore zero, since the forces opposing rotation are substantially equal on all blades, yet applied in opposing directions such that the forces cancel each other. By adjusting the pitch of one or more blades without affecting the pitch of the remaining blades, however, a force and torque imbalance about hub 204 is created, thereby producing rotation of vehicle 100 in a desired plane. In contrast to typical cyclic/collective techniques that re-direct the direction of fluid flow, the variable blade pitch techniques described herein adjust the orientation of the vehicle by creating force and torque imbalances about the vehicle's center of mass. Because even relatively small pitch variations on the control blade can produce significant moments about the vehicle's center of mass, the vehicle can be efficiently and precisely controlled using these techniques.

In the example shown in FIG. 2, as propeller 110 rotates in the direction of arrows 206, the pitch of one or more control blades 202 is adjusted to create additional impedance ($I_b$) at the 90 degree position by rotating the blade in the direction of arrow 210b. Similarly, the pitch of one or more control blades 202 is adjusted to create reduced impedance ($I_d$) at the 270 degree position. An increase in impedance may be created by, for example, pivoting blade 202b such that the broad face of the blade is more perpendicular to the direction of motion; decreases in impedance may be created by turning the broad face of blade 202d to be more parallel to the direction of movement. Because the impedance force is greater at the 90 degree position than at the 270 degree position of propeller 110, the imbalance of force between $I_b$ and $I_d$ produces a moment about hub 204 and/or driveshaft 112 (FIG. 1) that can be used to adjust the orientation of vehicle 100. The pitch of control blades 202b and 202d therefore changes as the blades rotate about hub 204.

Figure 3:
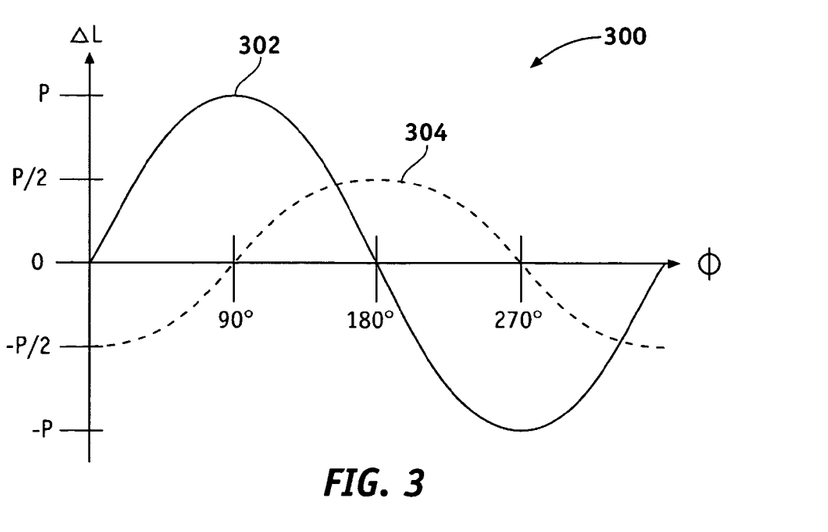
FIG. 3 is a plot of exemplary control signals for the rotatable blades.

FIG. 3 is a plot 300 of several exemplary pitch oscillations 302, 304 that could produce various changes in orientation of vehicle 100. Although waveforms 302, 304 represent blade pitch oscillations rather than actual control signals, these oscillations could generally correspond to control signal 106 shown in FIG. 1. Accordingly, control signal 106 may be provided to produce generally sinusoidal oscillations in the control blades, as shown in FIG. 3. Alternatively, blade pitch changes may be more linearly applied such that waveforms on plot 300 take on a sawtooth or triangular shape, as appropriate.

With continued reference to FIG. 3, changes in the phase and magnitude of oscillations 302, 304 can be used to produce different control effects upon vehicle 100. Waveform 302, for example, shows a sinusoidal variation that maximizes deflection (and therefore the impedance) at 90 degree and minimizes the impedance at 270 degrees, as described above in conjunction with FIG. 2. In a vehicle 100 with propeller 110 mounted aft of the center of mass, pivoting in this manner creates a "yaw" moment that steers the craft toward starboard. By inverting waveform 302 such that maximum impedance occurs at 270 degrees and minimum deflection occurs at 90 degrees, a yaw to port motion would be created. The directions of motion set forth in the preceding example will likely be reversed in embodiments wherein propeller 110 is mounted forward of the center of mass of vehicle 100. Similarly, waveform 304 shows blade deflections that would produce an upward pitch ("nose up") effect on vehicle 100.

By varying the location and magnitude of the blade pivot (corresponding to the phase and magnitude of waveforms 302, 304), then, vehicle 100 may be rotated about any desired plane of movement. Pitching and/or yawing movements, for example, may be applied by simply selecting the appropriate radial positions to pivot the control blades. Also, the amount of pivot applied may vary to produce large or small adjustments in vehicle 100. Waveform 302, for example, is shown to have an amplitude that is approximately twice the amplitude of waveform 304. Practical pivot waveforms used in various embodiments may have amplitudes of any magnitude (e.g. from zero to about 25 degrees or more). In an exemplary embodiment, a maximum pitch deflection of about 15 degrees may be used to adequately steer vehicle 100, although this value may vary dramatically in alternate embodiments. Similarly, phase shifts of any amount may be applied to produce torque in any reference plane to provide a desired pitch and/or yaw effect upon vehicle 100.

Figure 4B:
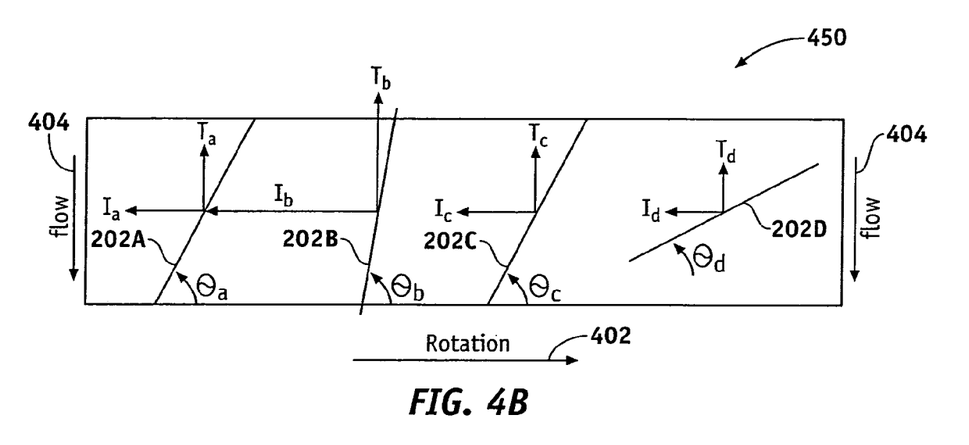
Figure 5:
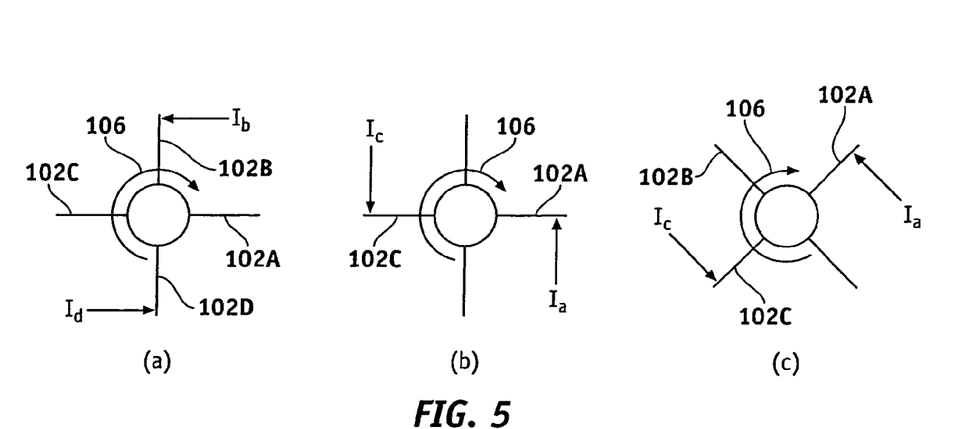
FIGS. 5(a)-(c) are free body diagrams showing exemplary forces applied to move a vehicle in different planes of movement.

The concepts of force and torque imbalance are further illustrated in FIGS. 4 and 5. FIG. 4 shows the forces applied to the various propeller blades 202A-D when the blade pitch (φ) is substantially equal for all of the blades. FIG. 5 shows the forces applied when control blades 202B and 202D are pivoted to a different pitch than blades 202A and 202C. In each Figure, the direction of propeller rotation is shown by arrow 402, and the direction of fluid flow is shown by arrow 404, although the same concepts described herein will work even if the directions of rotation and/or fluid flow are reversed.

As shown in FIG. 4, the force ($I_{a-d}$) opposing rotation is equal on all of the blades 202A-D. Because the blades are typically arranged in a regular pattern about hub 204 (FIG. 2), the impedance forces generally cancel each other, thereby resulting in a pure torque resulting from the thrust vectors $T_{a-d}$ shown. Although the magnitude of the thrust and impedance vectors varies with the pitch of the blades, the amount of thrust and the amount of impedance produced for a particular blade are generally proportional to each other. By properly varying the pitch of various blades 202, then, a torque imbalance may be created without significantly affecting the amount of thrust produced by propeller 110. In the example shown in FIG. 4, for example, blade 202B is rotated to a steeper angle (shown as $\phi_b$) with respect to the direction of rotation than blades 202A and 202C, resulting in a greater impedance vector ($I_b$) and thrust vector ($T_b$). The torque imbalance produced by blade 202B is further increased by decreasing the pitch ($\phi_d$) of blade 202D, which may be located directly opposite hub 204 (FIG. 2) from blade 202B such that the two blades are continuously 180 degrees out of phase with each other. Just as the increased pitch $\phi_b$ resulted in increased impedance and thrust, the decrease pitch $\phi_d$ results in decreased impedance and thrust produced by blade 202D. The decrease in impedance serves to increase the torque imbalance that produces rotation of vehicle 100; the decrease in thrust $T_d$ effectively compensates for the thrust increase produced by blade 202B, thereby maintaining an approximately constant total thrust produced by propeller 110. The total thrust will vary slightly as the blades pivot, since some momentum previously used to produce thrust is now consumed to produce residual rotational moments; nevertheless, the effects of this change in thrust will typically be negligible compared to the total amount of thrust produced by propeller 110.

As briefly discussed above, the unbalance in moments created by pivoting the control blades is translated into a force that is normal to the thrust axis and normal to the plane in which the blades are deflected. By varying the deflection plane, then, a normal force can be provided in any desired direction. FIGS. 5(a)-(c) show several exemplary impedance forces applied to a propeller 110. As briefly described above, applying maximum deflection at 90 and 270 degrees (FIG. 5(a)) typically results in a yaw movement, whereas deflection at 0 and/or 180 degrees typically results in a pitching movement (FIG. 5(b)) of vehicle 100. FIG. 5(c) demonstrates that pitching and yawing moments may be simultaneously provided by applying maximum deflection at other rotational positions of propeller 110.

The general concepts of steering a vehicle using variations in propeller blade pitch may be implemented in any manner across a wide array of alternate environments having one, two or any other number of propellers. Different types of propellers may be actuated or deflected using hydraulic or other mechanical structures, for example, or using any type of electronic control. In a further embodiment, a magnetic actuation scheme may be used to further improve the efficiency and performance of the vehicle control system.

Figure 6:
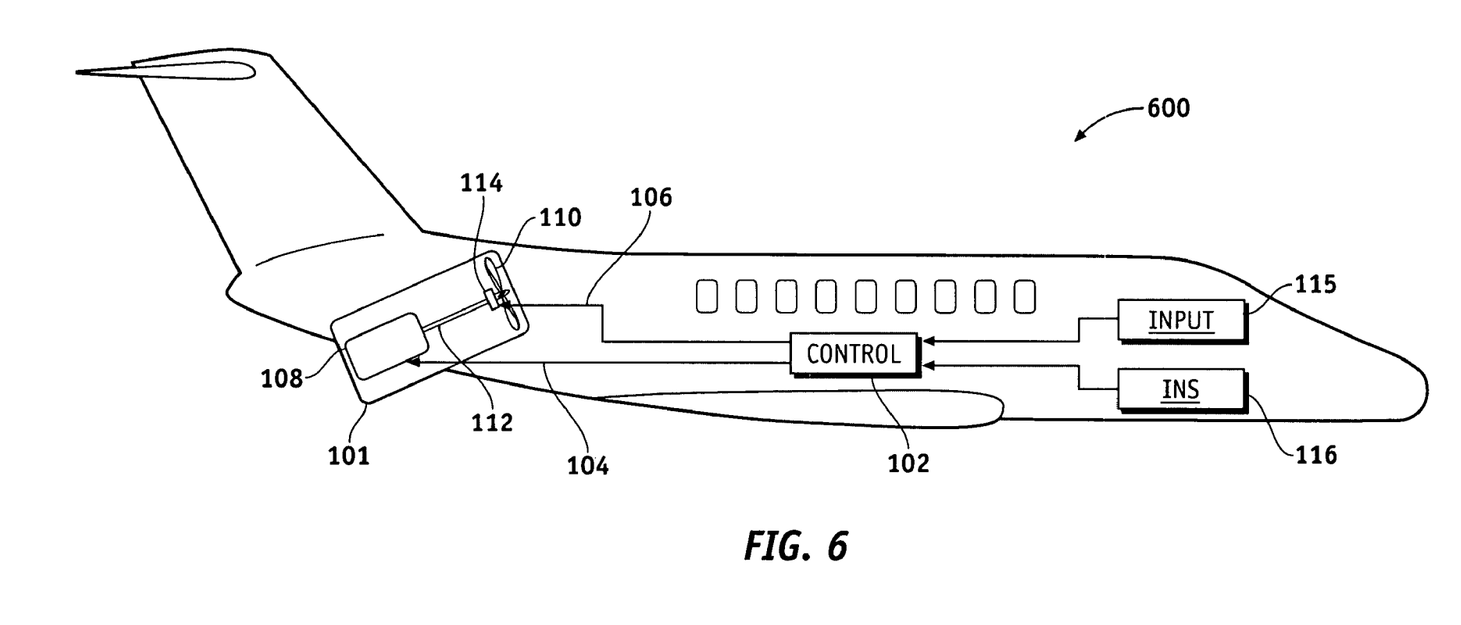
FIG. 6 is a side view of an exemplary aircraft with a variable blade pitch control pod.

Turning now to FIG. 6, an exemplary vehicle 600 such as an aircraft suitably includes one or more engine pods 101 capable of simultaneously propelling and guiding the vehicle 600 using the concepts set forth above. While the guidance aspects provided by pod 101 may be supplemented with conventional control surface assemblies (e.g. ailerons, flaps, elevators, etc.), such assemblies are not necessary in all embodiments. FIG. 6 shows a pod 101 affixed to the tail section of the aircraft to maximize the moments about the aircraft's center of mass produced by force imbalances on propeller 110. Pod 101 could alternatively be located elsewhere on the aircraft, however, such as on or underneath the wings of the vehicle. FIG. 6 also shows pod 101 mounted at an angle that produces both downward and rearward thrust components. While not necessary in all embodiments, this configuration may allow (or enhance) VTOL capabilities, maneuverability, responsiveness and/or other vehicle performance parameters. Pod 101 may be mounted at any angle, but an angle between about twenty and about seventy degrees from the horizontal may produce balance between downward and rearward thrust for many embodiments. As a result, the exemplary vehicle 600 shown in FIG. 6 includes pod 101 mounted at approximately a forty-five degree angle from the horizontal, although any other mounting angle could be used across a wide array of equivalent embodiments. Although only one pod 101 is visible in the side view shown in FIG. 6, another pod 101 could be mounted on the opposite side of vehicle 600 as appropriate.

Figure 7:
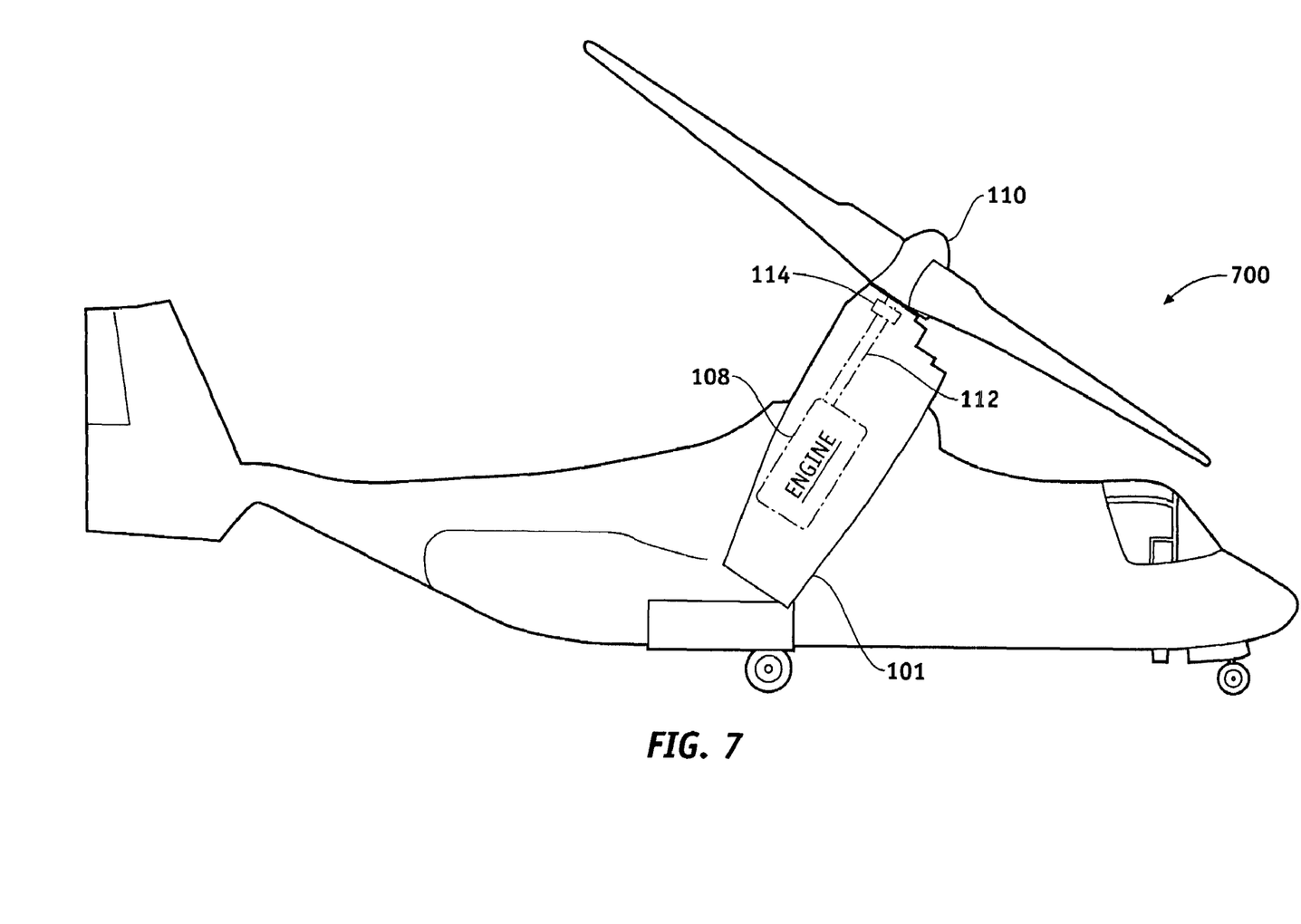
FIG. 7 is a side view of an alternate exemplary aircraft with a variable blade pitch control pod.

FIG. 7 shows an alternate aircraft 700 with a wing-mounted engine pod 101 having variable blade pitch capabilities as described above. While other aircraft such as the V-22A Osprey typically implement VTOL capabilities through rotatable engine pods that move propeller 110 between horizontal and vertical orientations, pod 101 shown in FIG. 7 (and a corresponding pod 101 on the opposing side of aircraft 700) can be rigidly fixed with respect to the vehicle, thereby significantly reducing cost and mechanical complexity while providing enhanced vehicle control through torque imbalances as described above. Alternatively, the force and torque imbalance techniques described herein could be used to supplement rotatable engine pods in aircraft such as the Osprey. Again, any number of engine pods 101 may be located at any location to propel and guide aircraft 700 in accordance with the principles described above.

While at least one exemplary embodiment has been presented in the foregoing detailed description, it should be appreciated that a vast number of variations exist. The concepts described herein with respect to aircraft, for example, are readily applied to other vehicles traveling through fluid media such as air or water. Similarly, the various mechanical structures described herein are provided for purposes of illustration only, and may vary widely in various practical embodiments. Accordingly, the various exemplary embodiments described herein are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that numerous changes can be made in the selection, function and arrangement of the various elements without departing from the scope of the invention as set forth in the appended claims and the legal equivalents thereof.

What is claimed is:

1. A vehicle having an integrated propulsion and guidance system, the vehicle comprising:
   an engine configured to rotate a driveshaft;
   a propeller coupled to the driveshaft to produce propulsive force, wherein the propeller comprises a hub and a plurality of blades comprising a control blade pivotably mounted to the hub; and
   a control system coupled to the propeller, wherein the control system is configured to provide a control signal to the propeller to produce blade pitch oscillations of the control blade as the control blade rotates such that one period of blade pitch oscillation is completed for each revolution of the control blade about the hub, and to vary the phase and magnitude of the blade pitch oscillations as the control blade rotates about the hub to thereby simultaneously propel and guide the vehicle with the propeller.

2. The vehicle of claim 1 wherein the propeller is rigidly fixed with respect to the vehicle at an angle wherein at least a portion of propulsive force is produced in a downward direction.

3. The vehicle of claim 2 wherein the angle provides at least a portion of the propulsive force in a rearward direction with respect to the vehicle.

4. The vehicle of claim 2 wherein the angle is substantially equal to forty five degrees.

5. The vehicle of claim 1 further comprising a second propeller, wherein the second propeller comprises a second hub and a second plurality of blades, and wherein at least one of the second plurality of blades is a second control blade pivotable with respect to the second hub.

6. The vehicle of claim 5 wherein the control system is further configured to provide a second control signal to the second propeller to pivot the second control blade with respect to the second hub as the second plurality of blades rotates about the second hub.

7. The vehicle of claim 5 wherein the second propeller is configured to rotate in an opposite direction from the propeller.

8. The vehicle of claim 7 wherein a direction of the propulsive force produced by the first and second propellers remains substantially unchanged as the control blade and the second control blade pivot with respect to the first and second hubs, respectively.

9. The vehicle of claim 5 wherein the second propeller is coupled to a second engine by a second driveshaft.

10. An aircraft having an integrated propulsion and guidance system, the aircraft comprising:
    a first turbine engine configured to rotate a first driveshaft in a first direction of rotation;
    a second turbine engine configured to rotate a second driveshaft in a second direction of rotation opposing the first direction of rotation;
    a first propeller coupled to the first driveshaft, wherein the propeller comprises a first hub and a first plurality of blades, and wherein the first plurality of blades comprises a first control blade pivotably mounted to the first hub;
    a second propeller coupled to the second driveshaft, wherein the propeller comprises a second hub and a second plurality of blades, and wherein the second plurality of blades comprises a second control blade pivotably mounted to the second hub; and
    a control system coupled to the first and second propellers, wherein the control system is configured to provide a first control signal to the first propeller and a second control signal to the second propeller to produce blade pitch oscillations of the first and second control blades as the first and second plurality of blades rotate about the first and second hubs, respectively, and to vary the phases and magnitudes of the blade pitch oscillations as the first and second propellers rotate to thereby simultaneously propel and guide the aircraft with the first and second propellers.

11. The aircraft of claim 10 wherein the control system is further configured to actuate the first and second control blades such that changes in the direction of thrust produced by the first propeller are offset by changes in the direction of thrust produced by the second propeller.

12. The aircraft of claim 10 wherein the control system is further configured to oscillate the first and second control blades such that one period of blade pitch oscillation is completed during one revolution of the blade about the hub.

13. An engine cell for an aircraft, the engine cell comprising:
    an engine configured to rotate a driveshaft;
    a propeller coupled to the driveshaft to produce propulsive force, wherein the propeller comprises a hub and a plurality of blades comprising a control blade pivotably mounted to the hub, wherein the control blade is responsive to a control signal to produce blade pitch oscillations of the control blade as the plurality of blades rotate about the hub, and to vary the phase and magnitude of the blade pitch oscillations as the propeller rotates about the hub to thereby simultaneously propel and guide the aircraft with the propeller.

14. The engine cell of claim 13 wherein the propeller further comprises a fixed blade rigidly fixed to the hub such that the blade pitch oscillations produce imbalances between a first portion of the propulsive force produced by the fixed blade and a second portion of the propulsive force produced by the control blade.

15. The engine cell of claim 13 wherein the control blade is configured to oscillate such that one period of blade pitch oscillation is completed for each revolution of the blade.

16. A propulsion and guidance system for a vehicle having an engine, the system comprising:
    an propeller rotationally coupled to the engine via a driveshaft, the propeller comprising a hub and a plurality of blades, wherein the plurality of blades comprises at least one pivotable blade having a variable pitch with respect to the hub and at least one fixed blade rigidly coupled to the hub; and
    a control system coupled to the propeller, wherein the control system is configured to provide a control signal to the propeller to thereby oscillate the blade pitch of the at least one pivotable blade as the plurality of blades rotates about the hub and to vary the phase of the blade pitch oscillations to thereby simultaneously propel and guide the vehicle with the propeller.

17. system of claim 16 wherein the control system is further configured to oscillate the blade pitch of the at least one pivotable blade such that one period of blade pitch oscillation is completed during one revolution of the blade about the hub.

* * * * *